June 23, 1964 E. L. LAUZE 3,138,233
FRICTION CLUTCHES
Filed June 26, 1961
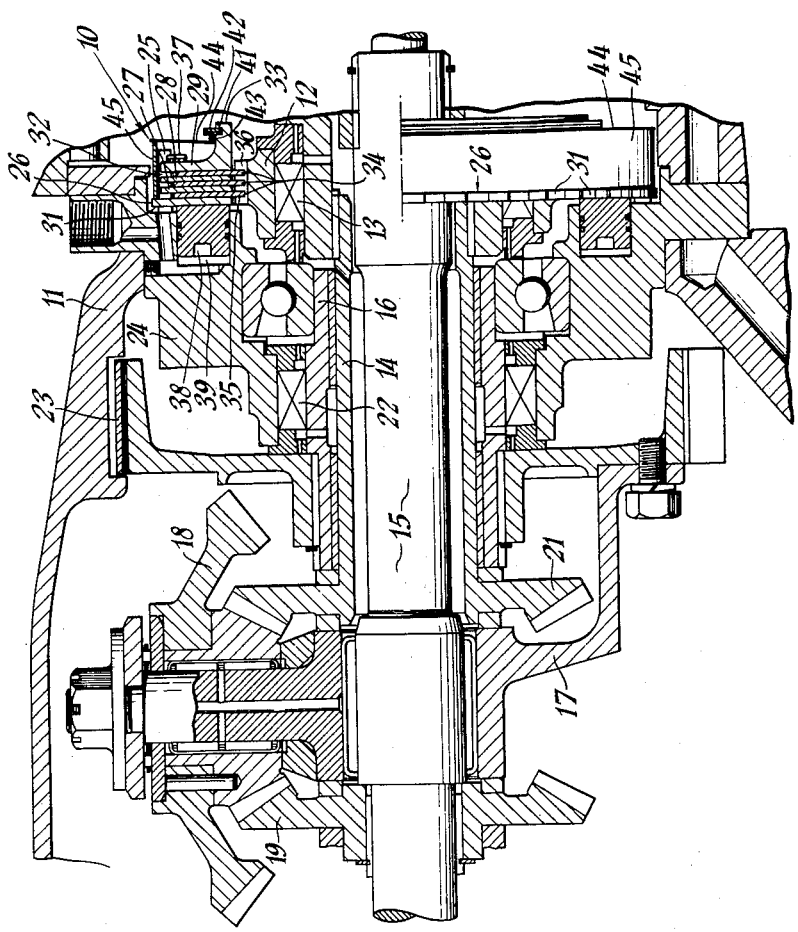
Inventor
Edmund L. Lauze
By Stevens Davis Miller & Mosher
Attorneys United States Patent Office 3,138,233
Patented June 23, 1964

3,138,233
FRICTION CLUTCHES
Edmund L. Lauze, Leamington Spa, England, assignor to Automotive Products Company Limited, Leamington Spa, England
Filed June 26, 1961, Ser. No. 119,353
Claims priority, application Great Britain June 29, 1960
5 Claims. (Cl. 192—69)

This invention relates to friction clutches of the multi-plate type and especially, but not exclusively to clutches of that type which are used in automatic change-speed gear mechanisms to effect changes of gear ratio by holding elements of a gear train against rotation relative to each other or to a fixed casing or the like.

Multi-plate clutches for such purposes are required to occupy as little space as possible in order to keep the overall dimensions of the mechanism within satisfactory limits, and the object of the present invention is to provide a compact clutch.

According to the present invention, in a multi-plate friction clutch having pressure applying means to clamp a pack of clutch plates together for clutch engagement and resilient means to separate the said clutch plates when the engaging pressure is relieved the said resilient means comprise a resilient annular disc having one peripheral edge in engagement with an abutment at one end of the pack of clutch plates and having its other peripheral edge in engagement with thrust means acting on the clutch plate at the other end of the stack.

Further, according to the invention, in a multi-plate friction clutch including a first set of plates mounted slidably but non-rotatably with respect to one supporting element, a second set of plates including one less plate than the first set, the plates of the second set being interleaved with the plates of the first set and mounted slidably but non-rotatably on a second supporting element rotatable relative to the first supporting element when the clutch is disengaged, and clutch engaging means acting on one end plate of the first set to urge all the plates towards an abutment on the first supporting element, separation of the plates to disengage the clutch is effected by a resilient annular disc supported at one edge by an abutment on an end plate of the first set and engaging at its other end with thrust means acting between it and the other end plate of that set.

The thrust means preferably comprises a sleeve surrounding the clutch plates.

The invention is hereinafter described with reference to the accompanying drawing which shows, partly in side elevation and partly in section, one form of multi-plate friction clutch according to the invention, together with associated parts of an automatic change-speed gear mechanism in which the clutch is used.

Referring to the drawing, the clutch, which is generally indicated by the reference 10 serves to hold against rotation, relative to a casing 11, a ring 12 forming the outer element of a free-wheel device 13. A sleeve 14 is held against rotation in one direction by the free-wheel device 13 when the clutch 10 is engaged, the sleeve 14 surrounding a shaft 15. Another sleeve 16 surrounding the sleeve 14 supports a carrier 17 for bevel gear clusters, one of which is shown at 18, for transmitting rotation from a driving bevel gear (not shown) to two driven bevel gears 19 and 21 mounted on the shaft 16 and on the sleeve 14 respectively, so that forward and reverse drive can be obtained respectively by coupling the shaft 16 or the sleeve 14 to a driven shaft. The clutch 10, by holding the ring 12 so that the sleeve 14 is held by the free-wheel device against rotation in one direction, enables the bevel gear 21 to serve as a fixed reaction point for the gearing when forward gear is engaged, thus providing a higher gear ratio than is in operation if the bevel gear 21 is free to rotate. The carrier 17 is held against backward rotation to provide a reaction point for forward drive when the bevel gear 21 is free to rotate, by another free-wheel device 22, and can also be held stationary by a band brake 23 to provide a reaction point for reverse drive.

The casing of the change-speed gear mechanism includes a transverse annular partition 24 integral with which is a longitudinally slotted cylindrical wall 25. One set of plates of the clutch 10 comprises four plates 26, 27, 28, 29 each provided with ears or lugs 31 on its outer periphery to engage in the slots 32 in the wall 25, the end or pressure plate 26 of the set nearest to the partition 24 having its lugs or ears projecting outwardly beyond the wall 25 as shown. The other end plate 29 of the set has a cylindrical wall 33 extending from its inner periphery. The other set of plates of the clutch 10 comprises three plates 34 each formed with ears or lugs 35 on its inner periphery to engage in longitudinal grooves 36 in the ring 12. Each plate 34 is interposed between two adjacent plates of the first set.

The plate 29 of the first set abuts against a clip ring 37 sprung into an internal groove in the cylindrical wall 25, and an annular piston 38 mounted in an annular cylinder 39 in the partition 24 acts on the plate 26 of that set, when fluid under pressure is admitted to the cylinder, to clamp the two sets of plates together.

The cylindrical wall 33 is grooved at 41 to receive a clip ring 42 against which abuts a ring 43 of circular cross section. An annular disc 44 of resilient metal rests at its inner periphery against the ring 43 and engages at its outer periphery with one end of a sleeve 45 encircling the plates 27, 28, 29 of one set and the plates 34 of the other set, the other end of the sleeve 45 engaging the projecting ears or lugs 31 on the plate 26. The disc 44 is initially flat, but is deformed on assembly of the clutch to the frusto-conical shape shown in the drawing, so that it exerts a separating force between the clutch plates 26 and 29 which is effective to disengage the clutch when no pressure is acting on the piston 38.

The clutch is thus engaged and held engaged by fluid pressure acting on the piston 38, and is released by the action of the resilient disc 44 when the fluid pressure is relieved.

The sleeve 45 through which the thrust of the resilient disc 44 is transmitted to the opposite end plate of the first set may be replaced by other thrust transmitting means. For example, the thrust transmitting means may comprise a series of rods disposed at intervals around the clutch and guided for sliding movement parallel to the axis thereof, the said rods each engaging at one end with the clutch plate 26 and at the other end with the resilient disc 44.

I claim:
1. A multi-plate friction clutch comprising a pack of clutch plates, pressure applying means for clamping said pack of clutch plates together for clutch engagement, and resilient means for separating said clutch plates when said pressure means is released comprising a resilient annular disc, abutment means disposed on one end of said clutch plates, a pressure plate disposed adjacent the other end of said clutch plates, thrust means acting on said pressure plate, the inner end of said disc bearing against said abutment means and the outer end of said disc bearing against said thrust means.

2. A multi-plate friction clutch including a first set of plates mounted slidably but non-rotatably with respect to one supporting element, a second set of plates including one less plate than the first set, the plates of the second set being interleaved with the plates of the first set and mounted slidably but non-rotatably on a second supporting element rotatable relative to the first supporting element when the clutch is disengaged, an abutment on said first element, clutch engaging means acting on one end plate of the first set to urge all the plates towards the abutment on the first supporting element, thrust means acting on said first supporting element, and means to cause separation of the plates to disengage the clutch comprising a resilient annular disc supported at one edge by said abutment on an end plate of the first set and engaging at its other end with said thrust means acting between it and the other end plate of that set.

3. A multi-plate friction clutch according to claim 2, wherein the thrust means comprise a sleeve surrounding the clutch plates.

4. In a multi-plate type friction clutch including a set of engaging plates and a set of engaged plates interposed between said engaging plates and adapted to be engaged thereby, a sleeve member surrounding most of said plates and engaging one of said set of engaging plates, and an annular resilient member having the outer peripheral edge engaging said sleeve member and the inner peripheral edge stationarily disposed so that said resilient member bears against said sleeve member to urge said set of engaging plates out of engagement with said set of engaged plates.

5. In a multi-plate type friction clutch including a set of engaging plates and a set of engaged plates interposed between said engaging plates, engaging means for causing said engaging plates to engage said engaged plates, thrust means disposed adjacent said sets of plates and engaging one of said set of engaging plates, and an annular resilient plate having an inner edge stationarily disposed and an outer edge engaging said thrust means to maintain said set of engaging plates out of engagement with said set of engaged plates when said engaging means are inactive.

References Cited in the file of this patent
UNITED STATES PATENTS

| | | |
|---|---|---|
| 2,290,513 | Wemp | July 21, 1942 |
| 2,523,501 | Davies et al. | Sept. 26, 1950 |
| 2,738,864 | Becker | Mar. 20, 1956 |
| 2,935,169 | Mills | May 3, 1960 |